(12) United States Patent
Yin et al.

(10) Patent No.: US 10,583,908 B2
(45) Date of Patent: Mar. 10, 2020

(54) INTELLIGENT SEA WATER COOLING SYSTEM

(71) Applicant: Circor Pumps North America, LLC, Monroe, NC (US)

(72) Inventors: Dan Yin, Waxhaw, NC (US); Stefan Werner, Allensbach (DE); Christian Martin, Radolfzell (DE); Martin Hoffmann, Moos (DE); David McKinstry, Charlotte, NC (US)

(73) Assignee: CIRCOR PUMPS NORTH AMERICA, LLC, Monroe, NC (US)

( * ) Notice: Subject to any disclaimer, the term of this patent is extended or adjusted under 35 U.S.C. 154(b) by 98 days.

(21) Appl. No.: 15/912,161

(22) Filed: Mar. 5, 2018

(65) Prior Publication Data

US 2018/0229824 A1    Aug. 16, 2018

Related U.S. Application Data

(62) Division of application No. 14/449,298, filed on Aug. 1, 2014, now Pat. No. 9,937,990.

(51) Int. Cl.
*B63H 21/38* (2006.01)
*G05B 15/02* (2006.01)
(Continued)

(52) U.S. Cl.
CPC ............ *B63H 21/383* (2013.01); *F01P 3/207* (2013.01); *F01P 7/164* (2013.01); *F01P 11/16* (2013.01);
(Continued)

(58) Field of Classification Search
CPC ......... B63H 21/383; F01P 3/207; F01P 7/164; F01P 11/16; F01P 2050/06; F04D 27/00; G05B 15/02
See application file for complete search history.

(56) References Cited

U.S. PATENT DOCUMENTS 6,254,734 B1    7/2001  Sephton
7,581,517 B2    9/2009  Brown
(Continued)

FOREIGN PATENT DOCUMENTS

| CN | 1161395 A | 10/1997 |
|---|---|---|
| CN | 101333957 A | 12/2008 |
| CN | 101622430 A | 1/2010 |
| CN | 201858698 U | 6/2011 |

(Continued)

OTHER PUBLICATIONS

International Search Report and Written Opinion dated Jan. 12, 2016 for corresponding PCT application, PCT/US2015/040145 filed Jul. 13, 2015.

*Primary Examiner* — Charles R Kasenge

(57) ABSTRACT

A sea water cooling system including a first fluid cooling loop coupled to a first side of a heat exchanger and to a thermal load, a second fluid cooling loop coupled to a second side of the heat exchanger and including a pump for circulating fluid through the second fluid cooling loop, and a controller operatively connected to the pump, wherein the controller is configured to monitor an actual temperature in the first fluid cooling loop and to adjust a speed of the pump based on the monitored temperature to achieve a predetermined temperature in the first fluid cooling loop. The system may be selectively operable in one of a plurality of operating modes, wherein in a first operating mode the pump operates based entirely on cooling demands of the thermal load, and in a second operating mode the pump operates to maintain a fluid pressure above a predefined pressure.

18 Claims, 4 Drawing Sheets

(51) Int. Cl.
   *F04D 27/00* (2006.01)
   *F01P 3/20* (2006.01)
   *F01P 11/16* (2006.01)
   *F01P 7/16* (2006.01)
(52) U.S. Cl.
   CPC ............ *F04D 27/00* (2013.01); *G05B 15/02* (2013.01); *F01P 2050/06* (2013.01)

(56) References Cited

U.S. PATENT DOCUMENTS

| | | |
|---|---|---|
| 7,743,740 B2 | 6/2010 | Brown |
| 7,900,468 B2 | 3/2011 | Spearing |
| 8,495,974 B2 | 7/2013 | Agosta |
| 8,522,552 B2 | 9/2013 | Waterstripe et al. |
| 8,583,290 B2 | 11/2013 | Campbell et al. |
| 8,857,798 B1 | 10/2014 | Sparrow et al. |
| 9,234,450 B2 | 1/2016 | England et al. |
| 2005/0034465 A1* | 2/2005 | Borchers ............... F04B 37/08 62/55.5 |
| 2006/0060326 A1 | 3/2006 | Halfmann et al. |
| 2006/0127183 A1* | 6/2006 | Bishop, Jr. ............ A01B 45/02 405/37 |
| 2007/0130093 A1 | 6/2007 | Haji-Valizadeh |
| 2008/0033402 A1* | 2/2008 | Blomquist ......... G06F 19/3456 604/890.1 |
| 2008/0034323 A1* | 2/2008 | Blomquist ............ A61M 5/172 715/810 |
| 2008/0126969 A1* | 5/2008 | Blomquist ............ A61M 5/142 715/771 |
| 2008/0302316 A1 | 12/2008 | Brown |
| 2008/0302317 A1 | 12/2008 | Brown |
| 2009/0013716 A1 | 1/2009 | Spearing |
| 2010/0018207 A1 | 1/2010 | Juchymenko |
| 2011/0036091 A1 | 2/2011 | Waterstripe et al. |
| 2011/0056192 A1 | 3/2011 | Weber et al. |
| 2011/0056674 A1 | 3/2011 | Campbell et al. |
| 2011/0060470 A1 | 3/2011 | Campbell et al. |
| 2011/0280705 A1 | 11/2011 | England et al. |
| 2012/0279681 A1 | 11/2012 | Vaughan et al. |
| 2013/0327042 A1 | 12/2013 | Waterstripe et al. |
| 2014/0033713 A1 | 2/2014 | Juchymenko |
| 2014/0269797 A1 | 9/2014 | Bishop et al. |

FOREIGN PATENT DOCUMENTS

| | | |
|---|---|---|
| CN | 202547223 U | 11/2012 |
| CN | 202978677 U | 6/2013 |
| CN | 103925734 A | 7/2014 |
| EP | 0122113 A2 | 10/1984 |
| JP | 3030726 U | 11/1996 |
| JP | 2008202556 A | 9/2008 |
| JP | 2009275512 A | 11/2009 |
| JP | 2010254281 A | 11/2010 |
| JP | 2011185560 A | 9/2011 |
| JP | 2012122371 A | 6/2012 |
| JP | 5286238 B2 | 9/2013 |
| JP | 2014046910 A | 3/2014 |
| JP | 2017528636 A | 9/2017 |
| KR | 920004275 B1 | 6/1992 |
| WO | 2016018601 A1 | 2/2016 |

* cited by examiner

INTELLIGENT SEA WATER COOLING SYSTEM

CROSS-REFERENCE TO RELATED APPLICATIONS

This application is a divisional of, and claims the benefit of priority to, U.S. patent application Ser. No. 14/449,298, filed Aug. 1, 2014, entitled "Intelligent Sea Water Cooling System," which application is incorporated herein by reference in its entirety.

This application is filed concurrently with co-pending application, entitled "Intelligent Sea Water Cooling System," which application is incorporated herein by reference in its entirety.

FIELD OF THE DISCLOSURE

The disclosure is generally related to the field of sea water cooling systems, and more particularly to a system and method for controlling the temperature in a fresh water cooling loop by regulating pump speed in a sea water cooling loop thermally coupled thereto.

BACKGROUND OF THE DISCLOSURE

Large seafaring vessels are commonly powered by large internal combustion engines that require continuous cooling under various operating conditions, such as during high speed cruising, low speed operation when approaching ports, and full speed operation for avoiding bad weather, for example. Existing systems for achieving such cooling typically include one or more pumps that draw sea water into heat exchangers onboard a vessel. The heat exchangers are used to cool a closed, fresh water cooling loop that flows through and cools the engine(s) of the vessel and/or other various loads onboard the vessel (e.g., air conditioning systems).

A shortcoming associated with existing sea water cooling systems such as that described above is that they are generally inefficient. Particularly, the pumps that are employed to draw sea water into such systems are typically operated at a constant speed regardless of the amount of sea water necessary to achieve sufficient cooling of the associated engine. Thus, if an engine does not require a great deal of cooling, such as when the engine is idling or is operating at low speeds, or if the sea water being drawn into a cooling system is very cold, the pumps of the cooling system may provide more water than is necessary to achieve sufficient cooling. In such cases, the cooling system will be configured to divert an amount of the freshwater in the freshwater loop directly to the discharge side of the heat exchangers, where it mixes with the rest of the freshwater that flowed through, and was cooled by, the heat exchangers. A desired temperature in the freshwater loop is thereby achieved. However, the system does not often require the full cooling power provided by sea water pumps driven at constant speed (hence the need to divert water in the fresh water loop). A portion of the energy expended to drive the pumps is therefore wasted. Thus, there is a need for a more efficient sea water pumping system for use in heat exchange systems servicing the marine industry.

SUMMARY

In view of the foregoing, it would be advantageous to provide an intelligent sea water cooling system and method that provide improved efficiency and fuel savings relative to existing sea water cooling systems and methods.

An exemplary intelligent sea water cooling system in accordance with the present disclosure may include a first fluid cooling loop coupled to a first side of a heat exchanger and to a thermal load, a second fluid cooling loop coupled to a second side of the heat exchanger and including a pump for circulating fluid through the second fluid cooling loop, and a controller operatively connected to the pump, wherein the controller is configured to monitor an actual temperature in the first fluid cooling loop and to adjust a speed of the pump based on the monitored temperature to achieve a predetermined temperature in the first fluid cooling loop. The system may be selectively operable in one of a plurality of operating modes accordance, wherein in a first operating mode the pump is operated based entirely on cooling demands of the thermal load, and in a second operating mode the pump is operated to maintain a fluid pressure above a predefined pressure.

A method is for establishing operating parameters in a variable flowrate cooling system in accordance with the present invention may include defining pump parameters at a first controller in the system, defining system parameters at the first controller, and automatically copying the pump parameters and system parameters from the first controller to at least one other controller in the system.

A method for establishing pump parameters in a controller of a variable flowrate cooling system in with the present invention may include storing pump parameters for a plurality of different types of pumps in the controller, connecting a pump to the controller, the controller automatically recognizing the pump that is connected to the controller, and the controller automatically loading pump parameters that correspond to the recognized pump.

A method for equalizing pump usage in a variable flowrate cooling system having a plurality of pumps in accordance with the present invention may include monitoring a total operating time for each pump, and reallocating usage of the pumps so that a pump having a relatively lower total operating time will be used more than a pump having a relatively higher total operating time.

BRIEF DESCRIPTION OF THE DRAWINGS

By way of example, specific embodiments of the disclosed device will now be described, with reference to the accompanying drawings, in which.

DETAILED DESCRIPTION

Figure 1:
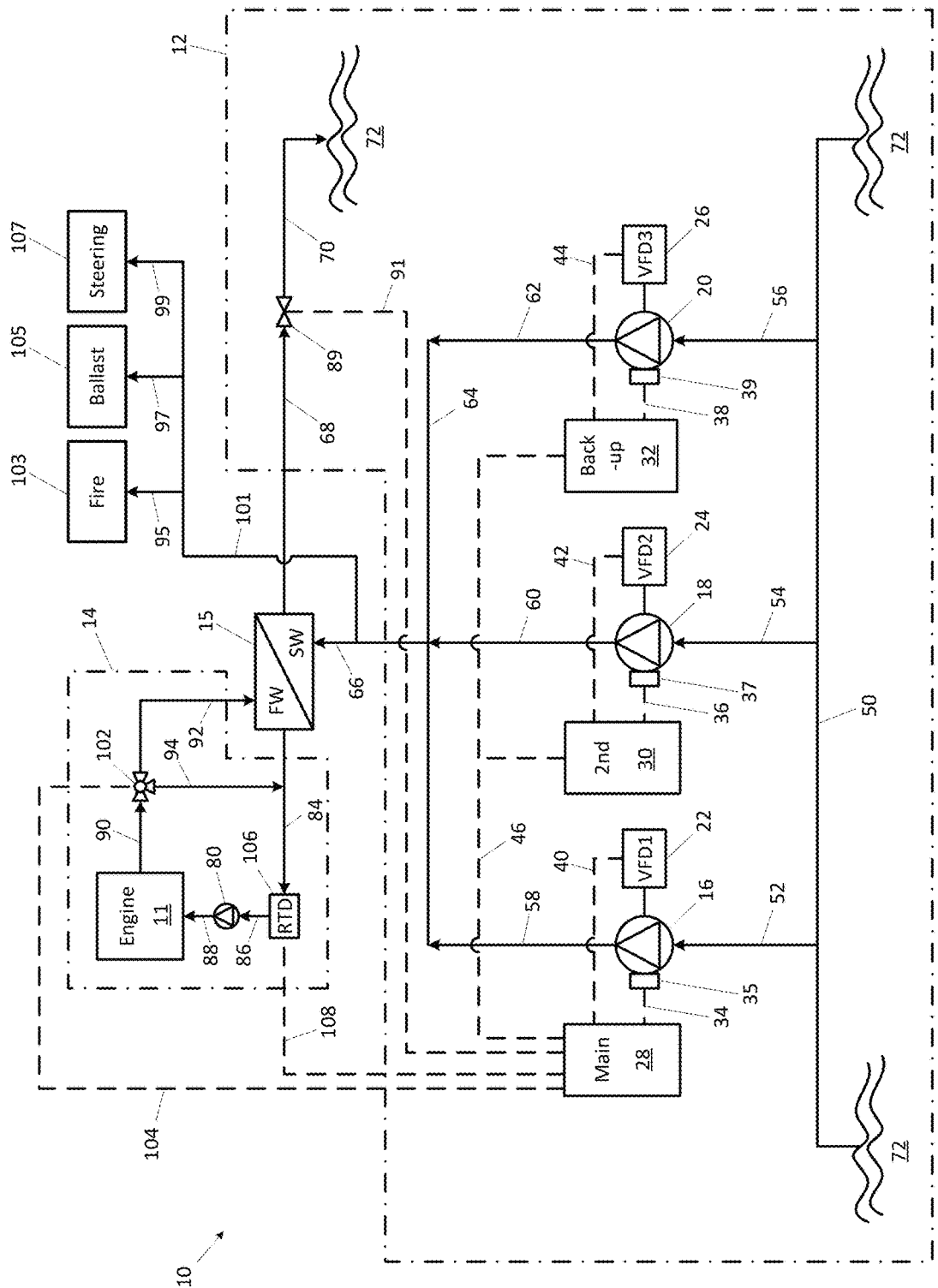
FIG. 1 is a schematic view illustrating an exemplary intelligent sea water cooling system in accordance system.

An intelligent sea water cooling system and method in accordance with the present disclosure will now be described more fully hereinafter with reference to the accompanying drawings, in which preferred embodiments of the system and method are shown. The disclosed system and method, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Referring to FIG. 1, a schematic representation of an exemplary intelligent sea water cooling system 10 (hereinafter "the system 10") is shown. The system 10 may be installed onboard any type of seafaring vessel or offshore platform having one or more engines 11 that require cooling. Only a single engine 11 is shown in FIG. 1, but it will be appreciated by those of ordinary skill in the art the engine 11 may be representative of a plurality of engines or various other loads onboard a vessel or platform that may be coupled to the cooling system 10.

The system 10 may include a sea water cooling loop 12 and a fresh water cooling loop 14 that are thermally coupled to one another by a heat exchanger 15 as further described below. Only a single heat exchanger 15 is shown in FIG. 1, but it is contemplated that the system 10 may alternatively include two or more heat exchangers for providing greater thermal transfer between the sea water cooling loop 12 and the fresh water cooling loop 14 without departing from the present disclosure.

The sea water cooling loop 12 of the system 10 may include a main pump 16, a secondary pump 18, and a backup pump 20. The pumps 16-20 may be driven by respective variable frequency drives 22, 24, and 26 (hereinafter "VFDs 22, 24, and 26"). The pumps 16-20 may be centrifugal pumps, but it is contemplated that the system 10 may alternatively or additionally include various other types of pumps, including, but not limited to, gear pumps, progressing cavity pumps, or multi-spindle screw pumps, or other positive-displacement pumps or other non-positive displacement pumps.

The VFDs 22-26 may be operatively connected to respective main, secondary, and backup controllers 28, 30, and 32 via communications links 40, 42, and 44. Various sensors and monitoring devices 35, 37, and 39, including, but not limited to, vibration sensors, pressure sensors, bearing temperature sensors, leakage sensors, and other possible sensors, may be operatively mounted to the pumps 16, 18 and 20 and connected to the corresponding controllers 28, 30 and 32 via the communications links 34, 36, and 38. These sensors may be provided for monitoring the health of the pumps 16, 18, and 20 as further described below.

The controllers 28-32 may further be connected to one another by communications link 46. The communications link 46 may be transparent to other networks, providing supervising communication capability. The controllers 28-32 may be configured to control the operation of the VFDs 22-26 (and therefore the operation of the pumps 16-20) to regulate the flow of sea water to the heat exchanger 15 as further described below. The controllers 28-32 may be any suitable types of controllers, including, but not limited to, proportional-integral-derivative (PID) controllers and/or a programmable logic controllers (PLCs). The controllers 28-32 may include respective memory units and processors (not shown) that may be configured to receive and store data provided by various sensors in the cooling system 10, to communicate data between controllers and networks outside of the system 10, and to store and execute software instructions for performing the method steps of the present disclosure as described below.

An operator may establish a plurality of pump parameters at the controller 28, VFD 22, or other user interface. Such pump parameters may include, but are not limited to, a reference speed, a reference efficiency, a reference flow, a reference head, a reference pressure, speed limits, suction pressure limits, discharge pressure limits, bearing temperature limits, and vibration limits. These parameters may be provided by a pump manufacturer (such as in a reference manual) and may be entered into the controller 28, VFD 22, or other user interface by the operator or by external supervising devices via the communications link 46. Alternatively, it is contemplated that the controller 28, VFD 22, or other user interface may be preprogrammed with pump parameters for a plurality of different types of commercially available pumps, and that the operator may simply specify the type of pumps that are currently being used by the system 10 to load a corresponding set of parameters. It is further contemplated that the controller 28 or VFD 22 may be configured to automatically determine the type of pumps that are connected in the system 10 and to load a corresponding set of parameters without any operator input.

An operator may also establish a plurality of system parameters at the controller 28, VFD 22, or other user interface. Such parameters may include, but are not limited to, a fresh water temperature range, a VFD motor speed range, a minimum pressure level, a fresh water flow, a water heat capacity coefficient, a heat exchanger surface area, a heat transfer coefficient, presence of a 3-way valve, and ambient temperature limits.

Pump parameters and system parameters that are established at the controller 28 or VFD 22 may be copied to the other controllers 30 and 32 and/or to the other VFDs 24 and 26, such as via transmission of corresponding data through the communications link 46. Such copying of the parameters may be performed automatically or upon entry of an appropriate command by the operator at the controller 28, VFD 22, or other user interface. The operator is therefore only required to enter the parameters once at a single interface instead of having to enter the parameters at each controller 28-32 and/or VFD 22-26 as in other pump systems.

The communications links 34-46, as well as communications links 81, 104 and 108 described below, are illustrated as being hard wired connections. It will be appreciated, however, that the communications links 34-46, 91, 104 and 108 of the system 10 may be embodied by any of a variety of wireless or hard-wired connections. For example, the communications links 34-46, 91, 104 and 108 may be implemented using Wi-Fi, Bluetooth, PSTN (Public Switched Telephone Network), a satellite network system, a cellular network such as, for example, a GSM (Global System for Mobile Communications) network for SMS and packet voice communication, General Packet Radio Service (GPRS) network for packet data and voice communication, or a wired data network such as, for example, Ethernet/Internet for TCP/IP, VOIP communication, etc.

The sea water cooling loop 12 may include various piping and piping system components ("piping") 50, 52, 54, 56, 58, 60, 62, 64, 66, 68, 70 for drawing water from the sea 72, through the pumps 16-20, and for circulating the sea water through the sea water cooling loop 12, including a seawater side of the heat exchanger 15, as further described below. The piping 50-70, as well as piping 84, 86, 88, 90, 92, 94, 95, 97, 99, and 101 of the fresh water cooling loop 14 and the additional systems 103, 105, and 107 described below, may be any type of rigid or flexible conduits, pipes, tubes, or ducts that are suitable for conveying sea water, and may be arranged in any suitable configuration aboard a vessel or platform as may be appropriate for a particular application.

The sea water cooling loop 12 may further include a discharge valve 89 disposed intermediate the conduits 68 and 70 and connected to the main controller 28 via communications link 91. It is contemplated that the discharge valve 89 may also be connected to the secondary controller 30 and/or the backup controller 32, as these controllers may automatically identify the connected discharge valve 89 and may automatically distribute information pertaining to the connection of the discharge valve 89 to one another via the communications link 46. The discharge valve 89 may be adjustably opened and closed to vary the operational characteristics (e.g., pressure) of the pumps 16-20 as further described below. In one non-limiting exemplary embodiment, the discharge valve 89 is a throttle valve.

The fresh water cooling loop 14 of the system 10 may be a closed fluid loop that includes a fluid pump 80 and various piping and components 84, 86, 88, 90, 92, and 94 for continuously pumping and conveying fresh water through the heat exchanger 15 and the engine 11 for cooling the engine 11 as further described below. The fresh water cooling loop 14 may further include a 3-way valve 102 that is connected to the main controller 28 via communications link 104 for controllably allowing a specified quantity of water in the fresh water cooling loop 14 to bypass the heat exchanger 15 as further described below.

A temperature in the fresh water cooling loop 14 may be measured and monitored by the main controller 28 to facilitate various control operations of the cooling system 10. Such temperature measurement may be performed by a resistance temperature detector 106 (hereinafter "RTD 106") or other temperature measurement device that is operatively connected to the fresh water cooling loop 14. The RTD 106 is shown in FIG. 1 as measuring the temperature of the fresh water cooling loop 14 on the inlet side of the engine 11, but it is contemplated that the RTD 106 may alternatively or additionally measure the temperature of the fresh water cooling loop 14 on the outlet side of the engine 11. The RTD 106 may be connected to the main controller 28 by communications link 108 or, alternatively, may be an integral, onboard component of the main controller 28. It is contemplated that the RTD 106 may also be connected to the secondary controller 30 and/or the backup controller 32, as these controllers may automatically identify the connected RTD 106 and may automatically distribute information pertaining to the connection of the RTD 106 to one another via the communications link 46.

The sea water cooling loop 12 may additionally provide sea water to various other systems of a vessel or platform for facilitating the operation of such systems. For example, sea water from the seawater cooling loop 12 may be provided to one or more of a fire suppression system 103, a ballast control system 105, and/or a sea water steering system 107 on an as-needed basis. Although not shown, other sea water-operated systems that may receive sea water from the sea water cooling loop 12 in a similar manner include, but are not limited to, sewage blowdown, deck washing, air conditioning, and freshwater generation.

In the exemplary system 10 shown in FIG. 1, sea water may be provided to the systems 103-107 via piping 95, 97, 99, and 101, which may be connected to the sea water cooling loop 12 at piping 66, for example. The piping 95-101 may be provided with various manually or automatically controlled valves (not shown) for directing the flow of sea water into the systems 103-107 in a desired manner. Of course, it will be appreciated that if sea water is supplied to the systems 103-107, the flow of sea water through the heat exchanger 15 will be reduced, which may cause the temperature in the fresh water cooling loop 14 to rise unless the operation of the pumps 16-20 is modified. The pumps 16-20 may therefore be controlled in manner that compensates for the use of sea water by the systems 103-107 as will described in greater detail below.

It is contemplated that the system 10 may monitor the total amount of time that each of the pumps 16-20 has been operating and may reallocate the operation of the pumps 16-20 in a manner that equalizes, or attempts to equalize, the operating times of the pumps 16-20. For example, if the main pump 16 has logged 100 hours of operation, the secondary pump 18 has logged 50 hours of operation, and the back-up pump has logged only 5 hours of operation, the system 10 may reassign the primary pump 16 to operate as a back-up pump and may reassign the back-up pump 20 to operate as a primary pump. The pumps 18 and 20 may thereby continue to accumulate significant operating time while the pump 16 remains substantially idle. By equalizing the operating times of the pumps 16-20 thusly, the pumps 16-20 may be caused to wear at a substantially uniform rate and may therefore be serviced or replaced according to a uniform schedule.

The above-described equalization procedure may be performed automatically, such as accordingly to a predefined schedule. For example, when one of the pumps 16-20 accumulates a predefined (e.g., operator-defined) amount of operating time since a last reallocation, the equalization procedure may be performed and the roles of the pumps 16-20 may be reassigned as necessary to equalize usage. The equalization procedure may also be initiated manually at the discretion of an operator, such as through the entry of an appropriate commend at an operator interface.

The system 10 may be operated in a variety of different operator-selectable modes, such as may be selected via an operator interface (not shown), wherein each operating mode may dictate a particular minimum system pressure that will be maintained by the system 10. For example, a first operating mode may be a "no threshold" or similarly designated mode which, if selected, will cause the system 10 to operate the pumps 16-20 without regard to any predetermined or specified minimum system pressure. That is, the system 10 will operate the pumps 16-20 based solely on the cooling demands of the engine 11. For example, if sea water is taken from the sea water cooling loop 12 by any of the sea water-operated systems (e.g., the ballast control system 105), the flow of sea water through the heat exchanger 15 will decrease, thereby reducing the amount of cooling in the fresh water cooling loop 14. The temperature of the water in the fresh water cooling loop 14 may therefore increase. As described above, the main controller 28 may then determine that the monitored temperature of the fresh water exceeds, or is about to exceed, a predefined temperature level, and the main controller 28 may respond by increasing the speed of the VFD 22 and may issue a command to the secondary controller 30 to increase the speed of the VFD 24. The corresponding main and/or secondary pumps 16 and 18 are thereby driven faster, and the flow of sea water through the sea water cooling loop 12 is increased. Greater cooling is thereby provided at the heat exchanger 15, and the temperature in the fresh water cooling loop 14 is resultantly decreased. Thus, a sufficient amount of sea water may be supplied for cooling the engine 11 and for operating a ship's sea water-operated systems in a purely "on-demand" fashion by driving the pumps 16-20 only as necessary to meet contemporaneous needs, thereby optimizing the efficiency of the system 10. This is to be contrasted with conventional sea water cooling systems, in which a minimum system pressure (i.e., a minimum sea water pressure that has been determined to be necessary for operating some or all of a ship's sea water-operated systems) is constantly maintained regardless of contemporaneous system needs.

A second selectable operating mode may be a "minimum threshold" or similarly designated mode which, if selected, may allow an operator to manually enter a minimum threshold value and will thereafter cause the system 10 to operate the pumps 16-20 in a manner that will keep a ship's system pressure above the manually specified threshold value. The minimum threshold value may be a value that is below a minimum system pressure (described above), but that provides some constantly maintained amount of sea water pressure in a ship's system. The ship's system pressure may be monitored by sensors that are integral with the ship and that are independent of the system 10, and may be communicated to the system 10 via a communications link, such as the communications link 46. The "minimum threshold" mode may be suitable for situations in which a system operator is not comfortable with operating the system 10 in a purely on-demand manner (as in the "no threshold" mode described above) but still wants to achieve a greater level of system efficiency relative to traditional sea water cooling systems in which a minimum system pressure in constantly maintained. After a system operator becomes comfortable with the on-demand capability of the system 10, the operator may lower or completely remove the minimum threshold value. This flexibility provides system operators with options to fit their application needs.

A third selectable operating mode may be a "minimum system pressure" or similarly designated mode which, if selected, will cause the system 10 to operate the pumps 16-20 in manner that will keep a ship's system pressure above the ship's predetermined (e.g., pre-calculated) minimum system pressure. As described above, the minimum system pressure may be a minimum sea water pressure that has been determined to be necessary for operating some or all of a ship's sea water-operated systems. Again, a ship's system pressure may be monitored by sensors that are integral with the ship and that are independent of the system 10, and may be communicated to the system 10 via a communications link. The "minimum system pressure" mode may be suitable for situations in which a system operator is not comfortable with operating the system 10 in a purely on-demand manner (as in the "no threshold" mode described above) or with maintaining a system pressure that is less than the minimum system pressure (as in the "minimum threshold" mode described above).

It will be appreciated that the above-described operating modes provide the system 10 with the flexibility to suit the preferences of various system operators without requiring any reconfiguration of system components prior to installation. Additionally, if the preferences of an operator change over time, such as if an operator is initially hesitant to operate the system 10 at less than a minimum system pressure, the operator may seamlessly switch between operating modes and graduate to purely on-demand operation as his/her comfort level increases.

Figure 2:
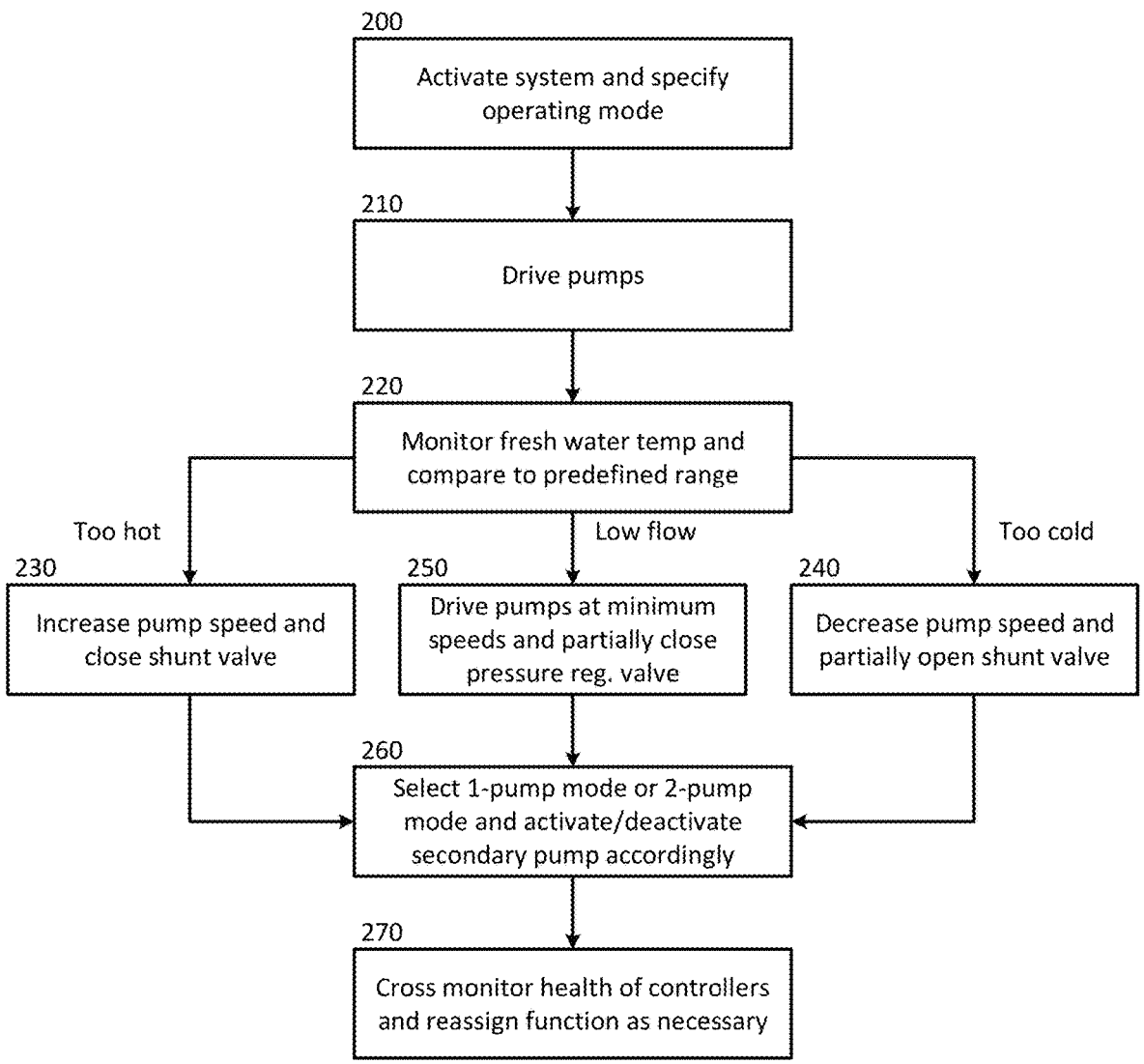
FIG. 2 is a flow diagram illustrating an exemplary method for operating the intelligent sea water cooling system shown in FIG. 1 in accordance with the present disclosure.

Referring to FIG. 2, a flow diagram illustrating a general exemplary method for operating the system 10 in accordance with the present disclosure is shown. The method will be described in conjunction with the schematic representation of the system 10 shown in FIG. 1. Unless otherwise specified, the described method may be performed wholly or in part by the controllers 28-32, such as through the execution of various software algorithms by the processors thereof.

At step 200, the system 10 may be activated, such as by an operator making an appropriate selection in an operator interface (not shown) of the system 10. Upon such activation, the operator may be prompted to select an operating mode which may dictate a minimum system pressure that will be maintained by the system 10. For example, the operator may be prompted to select one of the described above "no threshold," "minimum threshold," or "minimum system pressure" operating modes.

Once the system 10 has been activated and an operating mode has been specified, the main and secondary controllers 28 and 30 may, at step 210 of the exemplary method, command the VFDs 22 and 24 to begin driving at least one of the pumps 16 and 18. The pumps 16 and 18 may thus begin pumping sea water from the sea 72, through the piping 52 and 54, through the pumps 16 and 18, through the piping 58-66, through the heat exchanger 15, and finally through the piping 68 and 70 and back to the sea 72. As the sea water flows through the heat exchanger 15, it may cool the fresh water in the fresh water cooling loop 14 that also flows through the heat exchanger 15. The cooled fresh water thereafter flows through and cools the engine 11.

At step 220 of the exemplary method, the main controller 28 may monitor the temperature of the fresh water in the fresh water cooling loop 14 via the RTD 106. The main controller 28 may thereby determine whether the fresh water is at a desired temperature for providing the engine 11 with appropriate cooling, such as by comparing the monitored temperature to a predefined temperature range. For example, the desired temperature level of the freshwater at the discharge of the heat exchanger may be 35 degrees Celsius, and the range of the temperature may be +/−3 degrees Celsius.

If the main controller 28 determines at step 220 that the monitored temperature of the fresh water exceeds, or is about to exceed, a predefined temperature level, the main controller 28 may, at step 230 of the exemplary method, increase the speed of the VFD 22 and may issue a command to the secondary controller 30 to increase the speed of the VFD 24. The corresponding main and/or secondary pumps 16 and 18 are thereby driven faster, and the flow of sea water through the sea water cooling loop 12 is increased. Greater cooling is thereby provided at the heat exchanger 15, and the temperature in the fresh water cooling loop 14 is resultantly decreased. The main controller 28 may additionally command the 3-way valve 102 to adjust its position, thereby adjusting the amount of fresh water in the fresh water cooling loop 14 through the heat exchanger 15 in order to achieve optimal cooling of the fresh water.

Conversely, if the main controller 28 determines at step 220 that the monitored temperature of the fresh water is below, or is about to fall below, a predefined temperature level, the main controller 28 may, at step 240 of the exemplary method, decrease the speed of the VFD 22 and may issue a command to the secondary controller 30 to decrease the speed of the VFD 24. The corresponding main and secondary pumps 16 and 18 are thereby driven more slowly, and the flow of sea water through the sea water cooling loop 12 is decreased. Less cooling is thereby provided at the heat exchanger 15 and the temperature in the fresh water cooling loop 14 is resultantly increased. The main controller 28 may additionally command the 3-way valve 102 to adjust its position, thereby diverting some or all of the fresh water in the fresh water cooling loop 14 to bypass the heat exchanger 15 in order to further reduce the cooling of the fresh water.

Regardless of how little cooling the engine 11 may require, if the "minimum threshold" mode or the "minimum system pressure" mode were selected in step 200 above, the pumps 16 and 18 will not be driven at speeds that would allow the monitored ship's system pressure to fall below the predetermined minimum system pressure or the specified minimum threshold value (described above), respectively. Some minimum level of sea water pressure may therefore be maintained in the ship's system at all times for supplying sea water to the sea water-operated systems.

If the "no threshold" mode was selected in step 200, the system 10 will not operate according to any predetermined or specified minimum system pressure, but will instead operate solely in response to the cooling requirements of the engine 11 as described above to ensure that a sufficient amount of sea water is pumped in an on-demand manner to provide engine cooling and to supply sea water-operated systems.

Under certain circumstances, such as if the system 10 is operating in particularly cold waters and/or if the engine 11 is idling, it may be desirable to reduce the flow of sea water in the sea water cooling loop 12 to a rate below what may be achieved through the reduction of the pump speeds while maintaining stable operation of the pumps 16 and 18. That is, regardless of how little flow is required in the sea water cooling loop 12, it may be necessary to run the pumps 16 and 18 at a minimum safe operating speed to avoid cavitation or damage to the pumps 16 and 18, for example. If the main controller 28 determines that such a low flow rate of sea water is desirable, the main controller 28 may, at step 250, decrease the speed of the VFD 22 to drive the main pump 16 at or near a minimum safe operating speed, may command the secondary controller to decrease the speed of the VFD 24 to drive the secondary pump 18 at or near a minimum safe operating speed (or to shut down), and may further command the discharge valve 89 to partially close in order to maintain a required minimum system discharging pressure. By partially closing the discharge valve 89 thusly, the flow rate in the sea water cooling loop 12 may be restricted/reduced without further reducing the operational speeds of the pumps 16 and 18, and the minimum required system pressure can be maintained. The pumps 16 and 18 may thereby be operated above their minimum safe operating speeds while achieving a desired low flow rate in the sea water cooling loop 12. The discharge valve 89 may be controlled in a similar manner for keeping a ship's system pressure above a predetermined or specified system pressure (i.e., if the "minimum system pressure" mode or the "specified pressure" mode were selected in step 200).

Figure 5:
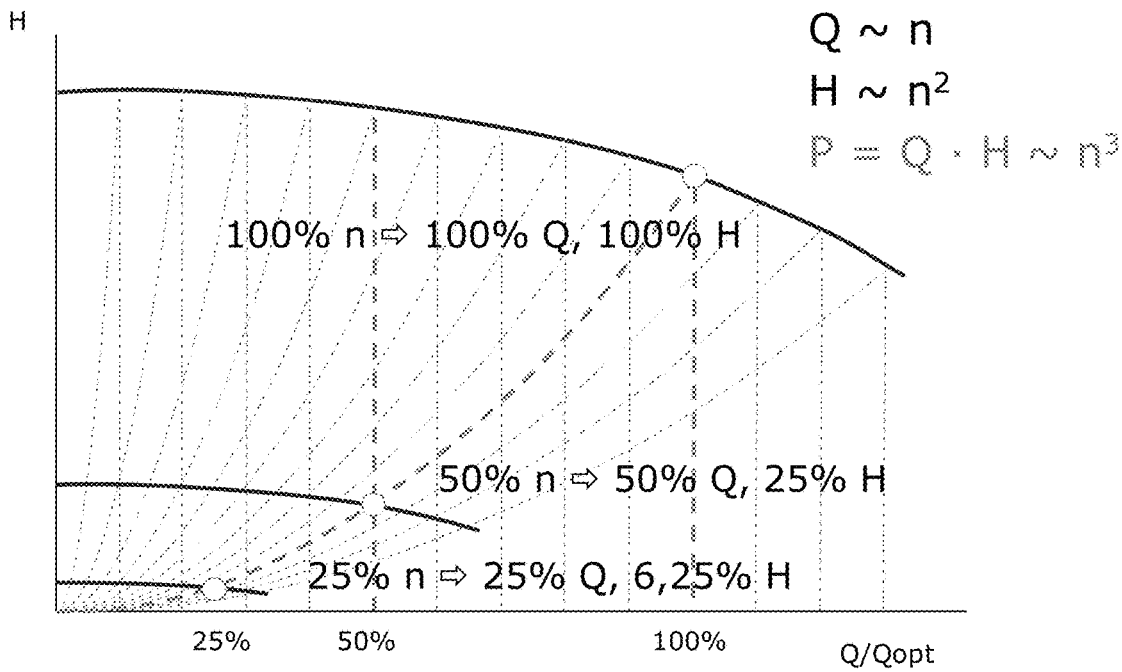
FIG. 5 is a graph illustrating energy savings as a result of reductions in pump speeds.

By continuously monitoring the temperature in the fresh water cooling loop 14 and adjusting the pump speeds and flow rate in the sea water cooling loop 12 in the manner described above, the pumps 16 and 18 may be driven only as fast as is necessary to provide a requisite amount of cooling at the heat exchanger 15 and/or to maintain a predetermined or specified minimum system pressure. The system 10 may therefore be operated much more efficiently and may provide significant fuel savings relative to traditional sea water cooling systems in which sea water pumps are driven at a constant speed regardless of temperature variations. Such improved efficiency is illustrated in the graph shown in FIG. 5. As will be appreciated by those of ordinary skill in the art, pump power "P" is proportional to the cube of pump speed "n," while flowrate "Q" is proportional to pump speed "n." Thus, when the disclosed system 10 is operated at a lower Q because of lower cooling demand from the engine, in lieu of running the pumps at maximum speed and simply shunting excess flow overboard or through a recirculation loop, substantial power savings can be achieved. For example, if Q=50% of the rated seawater flow Qopt, then the pumps 16, 18 need only be operated at 50% of their rated speed to provide 50% of Qopt. This reduction in speed results in a power "P" reduction of 87.5%, as compared to prior systems in which the pumps 16, 18 are operated at a constant maximum speed.

At step 260 of the exemplary method, the main controller 28 may determine whether the system 10 should be operated in a 1-pump mode or a 2-pump mode in order to achieve a desired efficiency and more energy savings. That is, it may be more efficient in some situations (e.g., if minimal cooling is required) to drive only one of the pumps 16 or 18 and not the other. Alternatively, it may be more efficient and/or necessary to drive both of the pumps 16 and 18 at a low speed. The main controller 28 may make such a determination by comparing the operating speeds of the pumps 16 and 18 to predefined "switch points." "Switch points" is determined by the ratio of Q/Qopt of either 1-pump or 2-pump operation, which can yield more efficient system. For example, if the system 10 is operating in 2-pump mode and both of the pumps 16 and 18 are being driven at less than a predetermined efficiency point, the main controller 28 may deactivate the secondary pump 18 and run only the main pump 16. While 1-pump is running, the efficiency Q/Qopt will increase, resulting a more efficient system over 2-pump operation. Conversely, if the system 10 is operating in 1-pump operation mode (e.g., running only the main pump 16) and the main pump 16 is being driven at greater than a predetermined efficiency point, the main controller 28 may activate the secondary pump 18.

Figure 6:
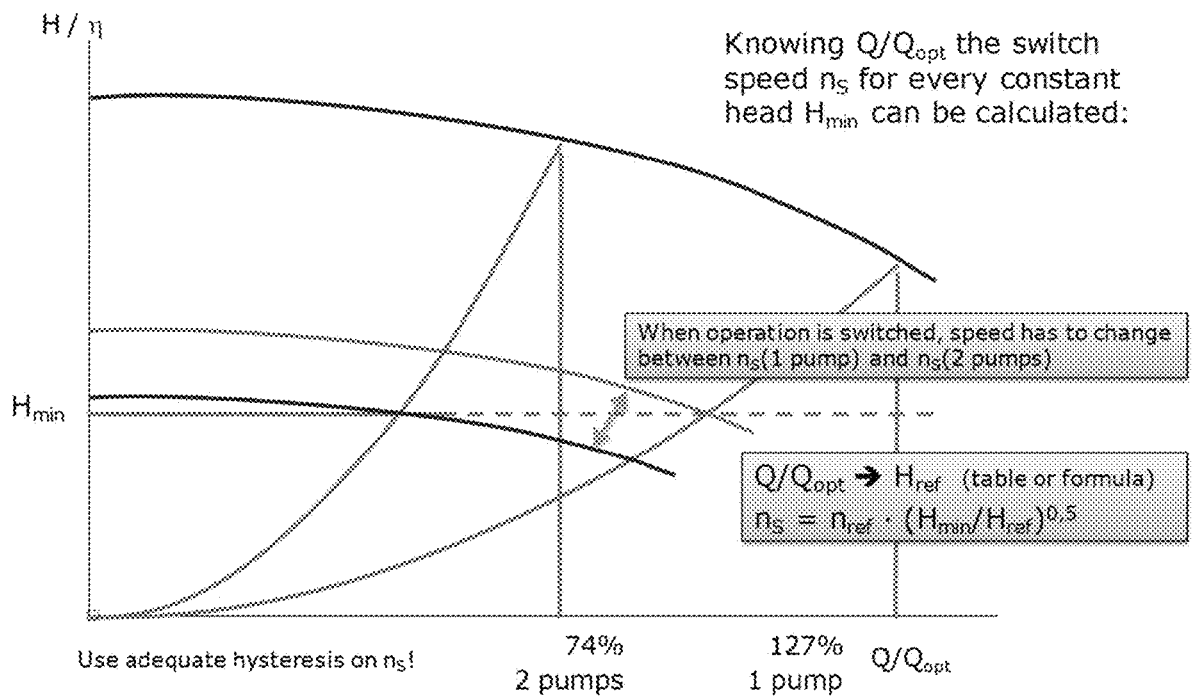
FIG. 6 is a graph illustrating exemplary means for determining whether to operate the system of the present disclosure with 1 pump or 2 pumps.

As shown in FIG. 6, The switch points (between one and two pump operation) may be determined based on the actual flow rate "Q" in the system 10 compared to optimal flow range "Qopt." According to the exemplary curve, when Q/Qopt exceeds 127% under single pump operation, the system can switch to two pump operation to operate most efficiently. Likewise, when Q/Qopt falls below 74% under two pump operation, the system can switch to single pump operation. At the same time, the discharging valve is controlled so that the required minimum system discharging pressure is maintained at all times.

At step 270 of the exemplary method, the main, secondary, and backup controllers 28, 30, and 32 may periodically transmit data packets to one another, such as via communications link 46. Such data packets may include information relating to the critical operational status, or "health," of each of the controllers 28-32 including their respective pumps 16-20 and VFDs 22-26. If it is determined that one of the controllers 28-32 has ceased to operate properly, or is trending in a direction that would indicate a near or far term malfunction, or if its communications link has malfunctioned or is otherwise inactive, the duties of that controller may be reassigned to another one of the controllers. For example, if it is determined that the secondary controller 30 has ceased to operate properly, the duties of the secondary controller 30 may be reassigned to the back-up controller 32. Alternatively, if it is determined that the main controller 28 has ceased to operate properly, the duties of the main controller 28 may be reassigned to the secondary controller 30 and the duties of the secondary controller 30 may be reassigned to the back-up controller 32. The system 10 is thereby provided with a level of automatic redundancy that allows to the system 10 carry on with normal operation even after the occurrence of component failures. If the ceased or questionable controller is repaired and/or restored to operational conditions, and is brought back to the operation, the information will be broadcast over the communication link to other controllers, the back-up controller will automatically stop its operation of its pump, and will be in stand-by mode for providing future needs for its back-up role.

Figure 3:
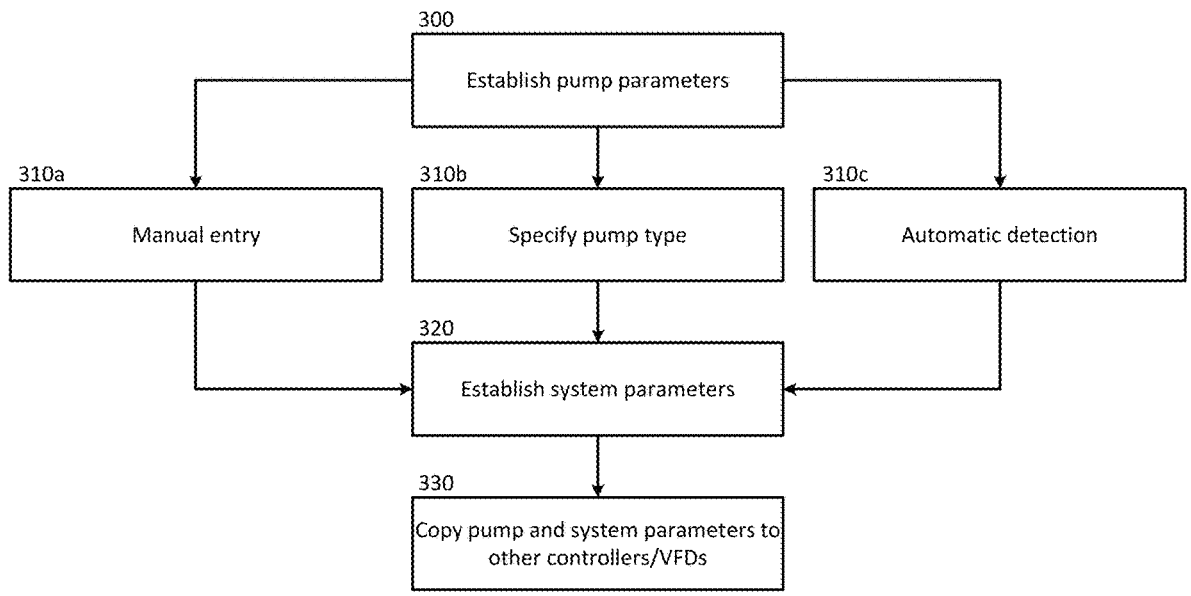
FIG. 3 is a flow diagram illustrating an exemplary method for establishing parameters in the intelligent sea water cooling system shown in FIG. 1 in accordance with the present disclosure.

Referring to FIG. 3, a flow diagram illustrating an exemplary method for inputting operating parameters into the system 10 in accordance with the present disclosure is shown.

At a first step 300 of the exemplary method, an operator may establish a plurality of pump parameters at the controller 28, VFD 22, or other user interface. As described above, such pump parameters may include, but are not limited to, a reference speed, a reference efficiency, a reference flow, a reference head, a reference pressure, speed limits, suction pressure limits, discharge pressure limits, bearing temperature limits, and vibration limits. These parameters may be provided by a pump manufacturer (such as in a reference manual) and may, at step 310a, be manually entered into the controller 28, VFD 22, or other user interface by the operator or by external supervising devices via the communications link 46. Alternatively, it is contemplated that the controller 28, VFD 22, or other user interface may be preprogrammed with pump parameters for a plurality of different types of commercially available pumps as described above, and that the operator may, at step 310b, simply specify the type of pumps that are currently being used by the system 10 to load a corresponding set of parameters. In another contemplated embodiment, the controller 28 or VFD 22 may be configured to automatically determine the type of pumps that are connected in the system 10 and to automatically load a corresponding set of parameters without any operator input as indicated at step 310c.

At step 320 of the exemplary method, the operator may establish a plurality of system parameters at the controller 28, VFD 22, or other user interface. Such parameters may include, but are not limited to, a fresh water temperature range, a VFD motor speed range, a minimum pressure level, a fresh water flow, a water heat capacity coefficient, a heat exchanger surface area, a heat transfer coefficient, presence of a 3-way valve, and ambient temperature limits.

At step 330 of the exemplary method, the pump parameters and system parameters that were established in the preceding steps may be copied to the other controllers 30 and 32 and/or to the other VFDs 24 and 26, such as via transmission of corresponding data through the communications link 46. Such copying of the parameters may be performed automatically or upon entry of an appropriate command by the operator at the controller 28, VFD 22, or other user interface. The operator is therefore only required to enter the parameters once at a single interface instead of having to enter the parameters at each controller 28-32 and/or VFD 22-26 as in other pump systems.

Figure 4:
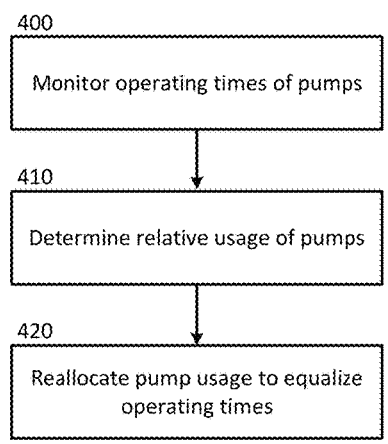
FIG. 4 is a flow diagram illustrating an exemplary method for equalizing pump usage in the intelligent sea water cooling system shown in FIG. 1 in accordance with the present disclosure.

Referring to FIG. 4, a flow diagram illustrating an exemplary method for equalizing usage of the pumps 16-20 of the system 10 in accordance with the present disclosure is shown.

At step 400 of the exemplary method, the system 10 may monitor the total amount of time that each of the pumps 16-20 has been operating. At step 410, the system 10 may determine whether one of the pumps 16-20 has been operating for a specified amount of time longer than at least one of the other pumps 16-20. At step 420, the system 10 may reallocate the operation of the pumps 16-20 in a manner that equalizes, or attempts to equalize, the operating times of the pumps 16-20. For example, if the main pump 16 has logged 100 hours of operation, the secondary pump 18 has logged 50 hours of operation, and the back-up pump has logged only 5 hours of operation, the system 10 may reassign the primary pump 16 to operate as a back-up pump and may reassign the back-up pump 20 to operate as a primary pump. The pumps 16 and 20 may thereby continue to accumulate significant operating time while the pump 16 remains substantially idle. By equalizing the operating times of the pumps 16-20 thusly, the pumps 16-20 may be caused to wear at a substantially uniform rate and may therefore be serviced or replaced according to a uniform schedule.

The above-described equalization procedure may be performed automatically, such as accordingly to a predefined schedule. For example, when one of the pumps 16-20 accumulates a predefined (e.g., operator-defined) amount of operating time since a last reallocation, the equalization procedure may be performed and the roles of the pumps 16-20 may be reassigned as necessary to equalize usage. The equalization procedure may also be initiated manually at the discretion of an operator, such as through the entry of an appropriate commend at an operator interface.

As used herein, the term "computer" may include any processor-based or microprocessor-based system including systems using microcontrollers, reduced instruction set circuits (RISCs), application specific integrated circuits (ASICs), logic circuits, and any other circuit or processor capable of executing the functions described herein. The above examples are exemplary only, and are thus not intended to limit in any way the definition and/or meaning of the term "computer."

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

What is claimed is:

1. A method for establishing operating parameters in a variable flowrate cooling system, comprising:
defining pump parameters at a first controller in the system;
defining system parameters at the first controller; and automatically copying the pump parameters and system parameters from the first controller to at least one other controller in the system;

wherein pump parameters for a plurality of different pumps are stored in memory associated with the first controller, and wherein defining the pump parameters comprises:

an operator specifying a type of pump that is connected to the first controller; and the first controller automatically loading pump parameters that correspond to the specified type of pump.

2. The method of claim 1, wherein defining the pump parameters comprises an operator manually entering the pump parameters.

3. The method of claim 1, wherein pump parameters for a plurality of different pumps are stored in memory associated with the first controller and wherein defining the pump parameters comprises:

the first controller automatically recognizing the type of pump that is connected to the first controller; and the first controller automatically loading pump parameters that correspond to the recognized type of pump.

4. The method of claim 1, wherein the first controller is operatively connected to a first pump, the first controller being configured to monitor an actual temperature in a first fluid cooling loop and to adjust a speed of the first pump based on the monitored temperature to achieve a predetermined temperature in the first fluid cooling loop.

5. The method of claim 4, wherein the variable flowrate cooling system is selectively operable in one of a plurality of operating modes, wherein in a first operating mode the first pump is operated based entirely on cooling demands of a thermal load, and in a second operating mode the first pump is operated to maintain a fluid pressure above a predefined pressure.

6. The method of claim 5, wherein the thermal load is a diesel engine.

7. The method of claim 5, further comprising a plurality of thermal loads.

8. The method of claim 4, wherein the system includes the first pump, and at least one other pump including at least one other controller, wherein the at least one other controller is operatively connected to the at least one other pump.

9. The method of claim 8, wherein the first pump and the at least one other pump are centrifugal pumps, gear pumps, progressing cavity pumps, screw pumps, positive displacement pumps, non-positive displacement pumps, or combinations thereof.

10. The method of claim 4, further comprising driving the first pump with a variable frequency drive operatively connected to the first controller, such that the first controller controls operation of the variable frequency drive to regulate a flow of seawater to a heat exchanger.

11. The method of claim 10, wherein the system includes a first fluid cooling loop coupled to a first side of the heat exchanger and to the thermal load, and a second fluid cooling loop coupled to a second side of the heat exchanger and including the first pump for circulating fluid through the second fluid cooling loop.

12. The method of claim 11, wherein in a first operating mode a temperature of freshwater in the first cooling loop is adjustable based on a flow of seawater through the second cooling loop.

13. The method of claim 11, wherein the first cooling loop includes a valve for adjusting a flow of freshwater in the first cooling loop through the heat exchanger.

14. The method of claim 13, wherein a temperature of the freshwater in the first cooling loop is adjustable by the valve such that at least a portion of the freshwater bypasses the heat exchanger.

15. A method for establishing pump parameters in a controller of a variable flowrate cooling system, comprising:

storing pump parameters for a plurality of different types of pumps in the controller;

connecting a pump to the controller;

at the controller, automatically recognizing the pump that is connected to the controller; and at the controller, automatically loading pump parameters that correspond to the recognized pump;

wherein the system includes a plurality of pumps operatively connected to a plurality of individual controllers, and the method further comprises automatically copying pump parameters that correspond to each recognized pump to the individual controller associated with each recognized pump.

16. The method of claim 15, wherein the system includes:

a first fluid cooling loop coupled to a first side of a heat exchanger and to a thermal load;

a second fluid cooling loop coupled to a second side of the heat exchanger and including a pump for circulating fluid through the second fluid cooling loop; and a controller operatively connected to the pump, wherein the controller is configured to monitor an actual temperature in the first fluid cooling loop and to adjust a speed of the pump based on the monitored temperature to achieve a predetermined temperature in the first fluid cooling loop;

wherein the system is selectively operable in one of a plurality of operating modes, wherein in a first operating mode the pump is operated to maintain a fluid pressure above a predefined pressure and in a second operating mode the pump is operated to maintain a fluid pressure above a predefined pressure.

17. The method of claim 16, wherein the thermal load is a diesel engine.

18. A method for establishing operating parameters in a variable flowrate cooling system, comprising:

defining pump parameters at a first controller in the system;

defining system parameters at the first controller; and automatically copying the pump parameters and system parameters from the first controller to at least one other controller in the system, wherein pump parameters for a plurality of different pumps are stored in memory associated with the first controller and wherein defining the pump parameters comprises:

the first controller automatically recognizing the type of pump that is connected to the first controller; and the first controller automatically loading pump parameters that correspond to the recognized type of pump.

* * * * *